United States Patent [19]

Mullen

[11] Patent Number: 4,783,967
[45] Date of Patent: Nov. 15, 1988

[54] DISPENSER WITH TEMPERATURE CONTROL

[75] Inventor: Joseph F. Mullen, Norristown, Pa.

[73] Assignee: Portion Control Systems, Inc., Philadelphia, Pa.

[21] Appl. No.: 62,218

[22] Filed: Jun. 12, 1987

Related U.S. Application Data

[63] Continuation-in-part of Ser. No. 920,153, Oct. 16, 1986, Pat. No. 4,738,114.

[51] Int. Cl.⁴ .............................................. F25B 21/02
[52] U.S. Cl. .......................................... 62/3; 62/378;
221/150 HC; 222/146.1
[58] Field of Search ............... 62/3, 458, 377, 378;
221/150 HC; 222/146.1

[56] References Cited

U.S. PATENT DOCUMENTS

| | | | |
|---|---|---|---|
| 2,641,112 | 6/1953 | Muffly | 62/378 |
| 2,679,143 | 5/1954 | Helsing | 62/378 |
| 2,932,953 | 4/1960 | Becket et al. | 62/3 |
| 2,943,452 | 7/1960 | Buchanan | 62/3 |
| 3,040,539 | 6/1962 | Gaugler | 62/3 |
| 3,149,471 | 9/1964 | Boehmer | 62/3 |
| 3,248,011 | 4/1966 | Brodsky et al. | 222/70 |
| 3,251,188 | 5/1966 | Dean et al. | 62/3 |
| 3,252,504 | 5/1966 | Newton | 165/2 |
| 3,351,233 | 11/1967 | Chanoch et al. | 62/3 X |
| 3,445,039 | 5/1969 | Brodsky et al. | 222/70 |
| 4,089,184 | 5/1978 | Beitner | 62/3 |
| 4,368,625 | 1/1983 | Platt | 62/378 |
| 4,676,074 | 6/1987 | Morgan, Jr. et al. | 62/378 X |

FOREIGN PATENT DOCUMENTS 3040490 5/1981 Fed. Rep. of Germany .

Primary Examiner—Lloyd L. King
Attorney, Agent, or Firm—Dann, Dorfman, Herrell and Skillman

[57] ABSTRACT

The present invention is directed to apparatus which is designed to dispense a variety of food service items such as packets of condiments, sauces, toppings, etc. The apparatus provides a receptacle in which the packets may be bulk-loaded without regard to their orientation. The packets may be mixed or matched without the necessity for loading them in magazines or other dispensing devices. An electrically-powered heat exchange means is provided to cool the apparatus.

13 Claims, 2 Drawing Sheets

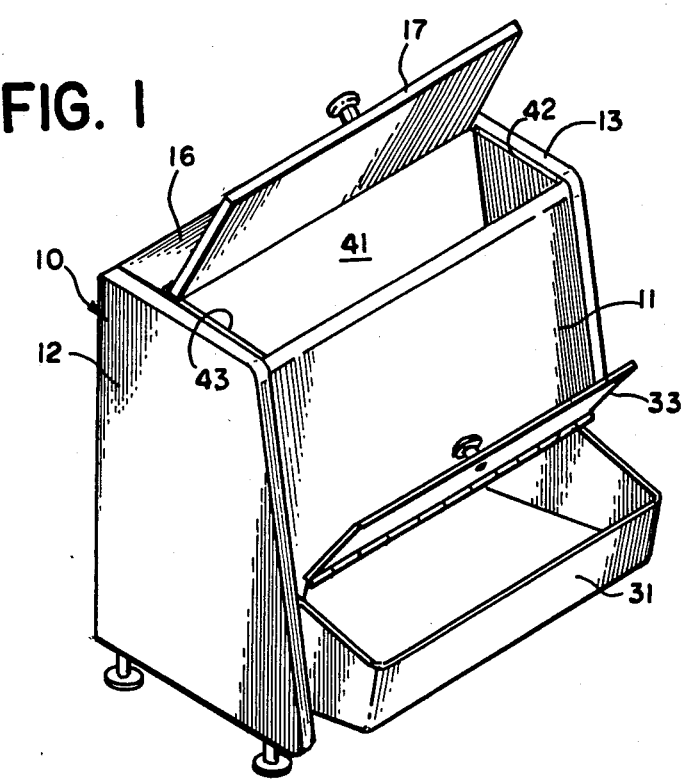
FIG. 1
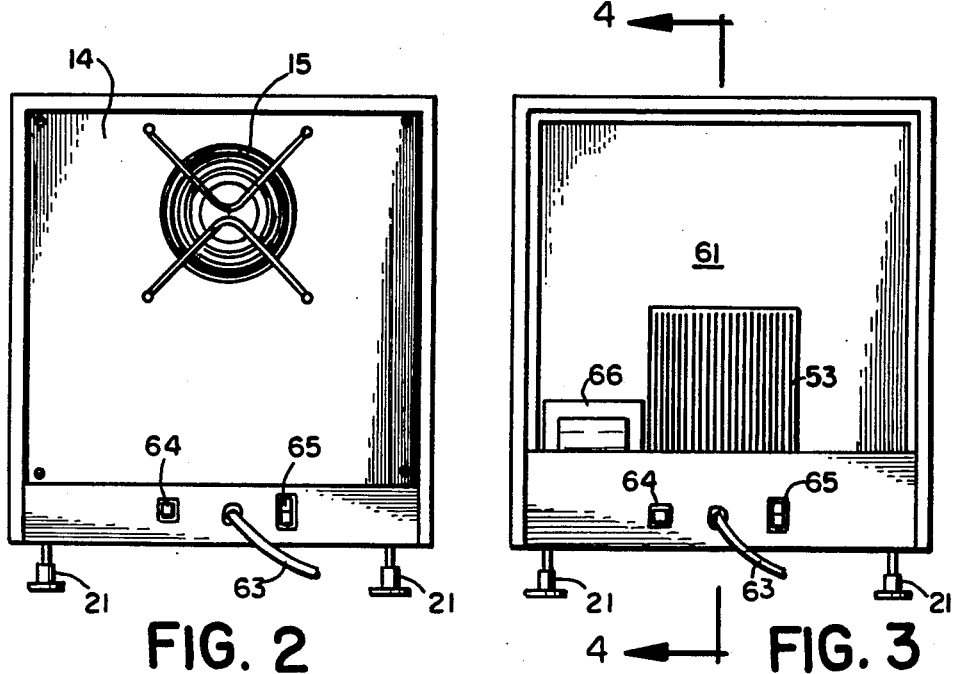
FIG. 2
FIG. 3

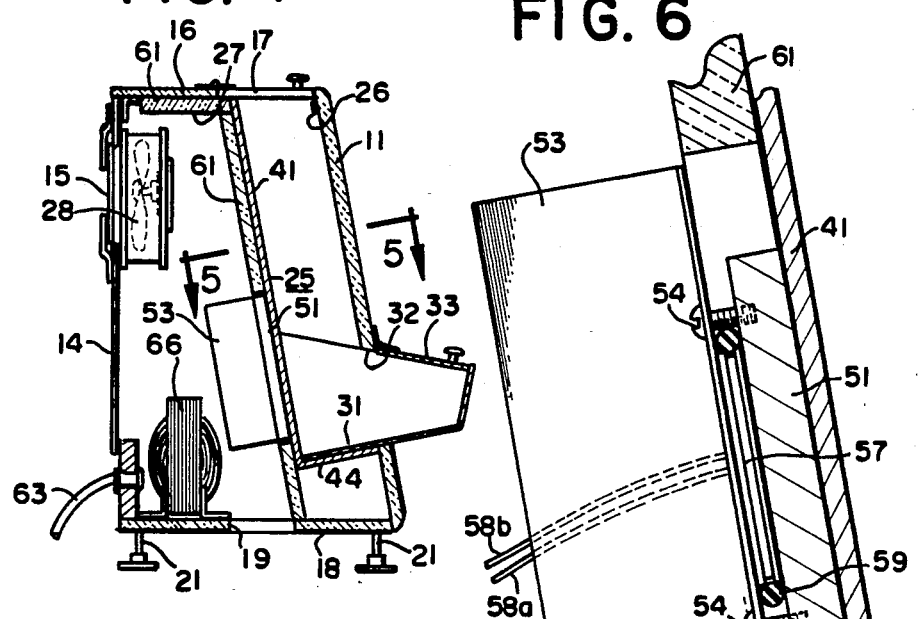
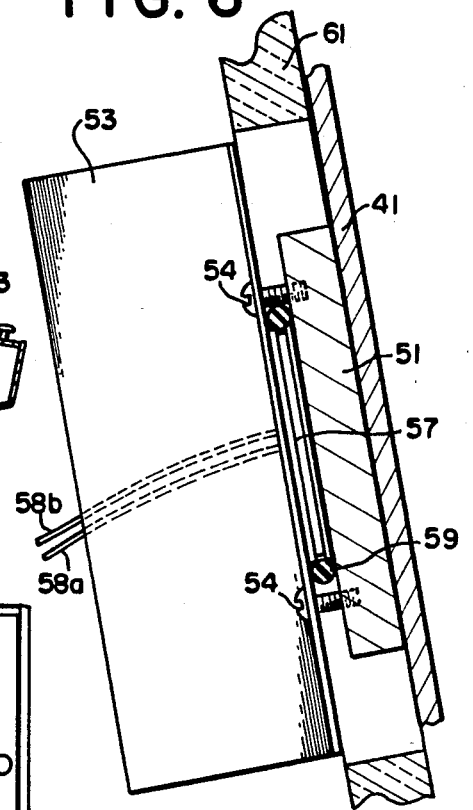
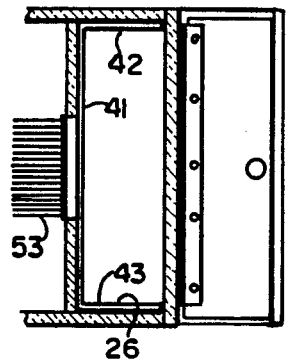
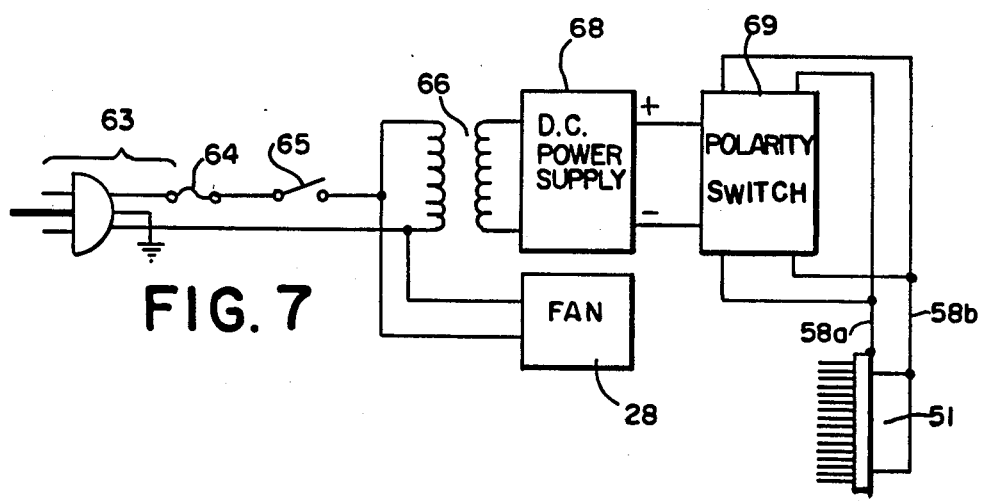

DISPENSER WITH TEMPERATURE CONTROL

RELATED APPLICATION

The present application is a continuation-in-part of my application Ser. No. 920,153, filed Oct. 16, 1986, now U.S. Pat. No. 4,738,114.

FIELD OF THE INVENTION

The present invention relates to a dispenser for food service items and more particularly to a dispenser having a temperature control for storing and dispensing packets of condiments, sauces, toppings, salads, beverages, creamers, and other food service items which should be stored and/or dispensed under controlled temperature conditions.

BACKGROUND OF THE INVENTION

In many food service establishments, and particularly convenience stores, fast food restaurants, and cafeterias, individual servings of food products are made available on a self-service basis.

Particularly in dairy products such as creamers for hot beverages, it is desirable to store the individual-serving packages of the product at a reduced temperature which retards spoilage and preserves the quality of the food product in the container. For toppings, it is desirable to store and dispense the packages at an elevated temperature to faciliate spreading or flow of the topping on the food item.

In establishments where the packages are made available in open trays or the like, there is a recognized tendency for the patrons to grab a handful of the packages without regard to their anticipated need. If the packages are in a restricted container, there is less tendency for the patrons to grab an excess supply of the packages.

During rush periods, the use of dispensers which do not have temperature controls may be satisfactory because of the need for constant replenishment of the supply of packages in the dispenser, but there is still a chance for an individual package to be left in the dispenser for prolonged periods, and such package might tend to spoil or deteriorate in quality. The use of mechanical refrigeration is not efficient for such dispensers and the use of water ice or dry ice to maintain a chilled atmosphere is not satisfactory because of the need for constant attention to assure replenishment of the supply of ice. Likewise, steam-heated or electrically heated storage dispensers are not efficient for packages which contain individual servings.

SUMMARY OF THE INVENTION

The present invention provides a simple dispenser for food service items which has a storage compartment and dispensing chamber which is capable of being accurately controlled as to temperature so that individual serving packages may be stored and dispensed under controlled temperature, either reduced or elevated, in a simple and efficient manner.

The present invention provides an improved storage and dispensing receptacle having a heat conductive lining which is maintained at a preselected temperature by a simple electrically actuated heat exchange module in heat transfer relationship to the conductive lining of the receptacle to assure proper control of the temperature of the items within the receptacle.

The receptacle has a configuration to provide optimum contact between the temperature-controlled walls of the receptacle and the food packages stored therein so as to assure efficient heat transfer to maintain the items at the preset temperature of the dispenser.

More specifically, the present invention provides a casing having a partition providing a receptacle for food packages at one side thereof and means for mounting a thermoelectric heat control module on the other side thereof. The space on the receptacle side of the partition confronts a heat conductive shoe and the space on the other side of the partition is lined with insulating material and provides a flow path for cooling air which may flow over the heat transfer module to dissipate the heat generated by the module in the course of cooling the receptacle. In the preferred embodiment of the invention, the receptacle provides a channel which is dimensioned relative to the dimensions of the items to permit the items to tumble down through the channel.

BRIEF DESCRIPTION OF THE DRAWINGS

The foregoing summary and the objectives of the invention will be more fully understood in connection with the attached drawings which illustrate a preferred embodiment of the present invention, and in which:

FIG. 1 is a perspective view of a dispenser embodying the present invention;

FIG. 2 is a rear view of the dispenser shown in FIG. 1;

FIG. 3 is a view similar to FIG. 2 showing the rear view of the dispenser with the back cover removed;

FIG. 4 is a sectional view taken on the line 4—4 of FIG. 3;

FIG. 5 is a sectional view taken on the sloping line 5—5 of FIG. 4;

FIG. 6 is an enlarged vertical section showing the attachment of the heating module; and FIG. 7 is a circuit diagram illustrating the electrical connections of embodiment shown in FIG. 1.

DESCRIPTION OF THE PREFERRED EMBODIMENT

A dispenser embodying the present invention is illustrated in FIG. 1 and includes a generally trapezoidal container having a sloping front wall 11, a pair of complimentary vertical sidewalls 12 and 13, and a removable backwall 14 which has a grille opening 15 therein. Spanning between the sidewalls 12 and 13 at the top, a top wall 16 has a pivoted cover element 17, and at the bottom, a bottom wall 18 having an air inlet opening 19 therein. (See FIG. 4) Support feet 21 are provided to elevate the bottom wall 18 above the level of the mounting surface so as to permit air flow into the casing through the inlet opening 19. Preferably, the legs 21 are individually adjustable to permit accommodation to variations in the countertop or other surface on which the dispenser is mounted.

As shown in FIG. 4, the casing has an interior partition 25 which is spaced parallel to the sloping front wall 11 of the casing. In front of the partition 25 a storage receptacle 26 is formed and behind the partition 25, a chamber 27 is provided which communicates at its lower end with the inlet opening 19 and at its upper end with the outlet grille 15 so as to provide a path for ambient air through the space. An air pump, in the present instance an axial fan 28, is provided adjacent the discharge opening 15 to generate an air flow through the chamber 27 at the rear of the partition 25.

As shown in FIG. 1, the lid 17 may be opened to provide access for charging the top of the receptacle 26 with food service items to be dispensed, and the bottom of the receptacle 26 is provided with a dispensing bin 31 which projects outwardly through an opening 32 in the front wall 11 and is provided with a hinged cover 33 which may be raised as shown in FIG. 1 to gain access to the food service items resting in the bin 31. The restricted opening 32 in the front sidewall causes the food service items to accumulate within the channel of the receptacle 26 and discharges a limited number of items outwardly through the discharge opening so as to rest in the projecting part of the bin 31 where they may be removed one-by-one. The dispensing of the food service items in this fashion reduces the tendency for individuals to take more items than is necessary for their individual needs.

In accordance with the invention, the food service items in the receptacle 26 are stored and dispensed at a controlled temperature which may be either reduced or elevated relative to ambient conditions surrounding the casing. To this end, the partition 25 includes on its forwardly facing surface a thermally conductive shoe of U-shaped cross section. The shoe comprises a base plate 41 disposed flush against the partition 25 and a pair of outwardly projecting side flanges 42 and 43 extending across the full width of the receptacle 26 so that the front wall 11 of the casing bridges between the outer terminal edges of the side flanges 42 and 43 to define a restricted passage or channel for the items in the receptacle. At the lower end of the base plate 41 the shoe has a bottom wall 44 which extends outwardly to the front wall 11 and across the full width of the receptacle between the side flanges 42 and 43 of the shoe. The shoe is formed of a thermally conductive material throughout so as to provide a uniformly controlled temperature within the receptacle by reason of the base plate 41 and the side flanges 42 and 43 overlying the bottom wall 44.

In the present, the bin 31 is a stainless steel chute interfitted with the bottom of the shoe, flush against the side flanges 42 and 43 and the bottom wall 44 so as to provide thermal conductivity between the stainless steel chute forming the bin 31 and the shoe. In this way, the bin is maintained at the same temperature as the shoe thereby providing a uniform control of the temperature of the items which are stacked up within the receptacle 26 as well as the items discharged through the discharge opening 32 into the outwardly projecting part of the bin 31.

In order to assure proper temperature control of the items in the receptacle, the spacing between the base plate 41 of the shoe and the front wall 11 is limited so that no more than two or three items will fit in the spacing. In this fashion, as the items travel down through the receptacle as items are removed from the bin, the items are always close to the thermally conductive material of the base plate 41 or the side flanges 41 and 43.

Although it may be desired in some instances to stack the items in the receptacle so that they travel one after another down the channel and through the discharge opening 32, it is commonly desired to allow the items to tumble down the channel and into the bin 31. In such case, the items will usually have substantially equal dimensions along the x, y and z axes. The depth of the channel (as determined by the height of the flanges 42 and 43) is preferably greater than the largest of the three dimensions and less than three times the largest of the three dimensions. In this way, the items are free to tumble as they pass down the receptacle. For example, in a dispenser for use with beverage creamers in cup-like packages of about an inch in diameter and about one inch deep, the spacing between the base plate 41 and the shoe is about two and one-half inches and the distance between the side flanges 42 and 43 is about twelve inches. In this way, the the creamer cups are no further away from the base plate 41 than the distance of one cup, and as the cups travel through the receptacle from the top to the bin, the tumbling action of their movement makes it likely that for a part of their travel they will be immediately adjacent the base plate 41 or one of the side flanges 42 and 43.

In accordance with the invention, the shoe is maintained at the desired temperature by the use of an electrically powered heat exchange means mounted in the partition. In the present instance, the heat exchange means is powered by direct current so that when a positive current is applied to the device, one face is heated and the other face is cooled. When the polarity is reversed, the first face is cooled and the other face is heated. The use of an electrically powered heat exchange device of this nature avoids the need for mechanical refrigeration units, or direct heat exchange arrangements such as dry or wet ice, or indirect heat exchange fluids, such as brine or refrigerant. As shown in FIG. 6, the heat exchange element 51 is mounted flush against the base 41 of the shoe so as to be thermally coupled therewith whereby, in view of the thermally conductive nature of the shoe, the shoe assumes the temperature of the forward face of the unit 51. The opposite face of the unit is exposed to the chamber 27 so that it is disposed in the path of travel of the air flow from the inlet 19 to the outlet 15. To facilitate the dissipation of heat when the rear face is heated, and dissipation of the coolness when the rear face is cooled, the face is provided with fins 53 which, in the present instance, are bolted to be thermally coupled to the rear face of the unit 51, for example, by bolts 54. There is a series of fins which comprise spaced parallel flat plates disposed parallel to the direction of air flow in the air path from the inlet 19 to the outlet 15, whereby the air flow generated by the fan 28 is caused to pass between the fins 53 and dissipate the heat or coolness radiated into the air flow from the fins.

The unit 51 is provided with electrical connections at its rear as indicated at 57 and the power is supplied to the connections 57 through suitable leads 58a and 58b from a source of d.c. power as described in connection with FIG. 7 hereinafter. When a positive polarity power is applied to the lead 58a for the connections 57, the forward face of the unit 51 is cooled and the rear face is heated, which heat is dissipated by the fins 53. When negative d.c. power is applied to the lead 58a, the forward face of the unit 51 is heated and the rear face is cooled and the coolness is dissipated through the fins 53. In order to prolong the life of the unit, particularly when the rear surface of the unit is cooled, the electrical connections 57 are isolated from the bolts by an O-ring 59 compressed between the faces of the fins 53 and the rear face of the unit 51. This prevents condensation on the cold rear face of the unit 51 from interfering with the connections 57. The unit is mounted on the base 41 of the shoe, preferably by screws, so as to insure intimate, face-to-face contact which minimizes the thermal loss between the unit 51 and the base 41.

Surrounding the unit 51, the rear face of the shoe 41 is provided with an insulating layer 61 which, as shown in FIG. 4, extends the full height of the chamber 27 and also extends rearwardly under the top wall 16 of the casing. The insulating layer 61 is preferably composed of a thickness of foam material having an impermeable foil surface layer confronting the chamber 27.

The chamber 27, along with providing a flow path for the heat transfer air flowing from the inlet through the outlet 15, also houses the power supply for the dispenser. To this end, the dispenser may be powered from a suitable a.c. source as indicated by the line 63. As shown in FIG. 7, the line 63 feeds through a fuse 64 and a switch. A transformer 66 which reduces the a.c. voltage to a safe 24 volt level feeds a d.c. power supply 68 having positive and negative output as indicated. In addition, the fan 28 is connected in parallel with the transformer 66 so that it is activated whenever the switch 65 is closed. The d.c. output from the power supply 68 is fed to the unit 51 through a polarity reversing switch 69 which may apply the positive voltage to either of the lines 58a and 58b while applying negative voltage to the opposite line. Thus by reversing the polarity switch 69, the unit 51 may be activated for either cooling or heating the shoe 41.

While a particular embodiment of the present invention has been herein illustrated and described, it is not intended to limit the invention to such disclosure but changes and modifications may be made therein and thereto within the scope of the following claims.

I claim:

1. A temperature-controlled dispenser for a variety of food service items, particularly items having given outside dimensions along three axes, comprising:
   (a) a casing having a transverse partition including a thermally-conductive shoe of U-shaped cross section providing a channel cooperating with the casing to form a storage receptacle for said items at one side of said partition, said receptacle defining an upright channel having a horizontal depth sufficiently greater than the largest of the outside dimensions of the particular items, but less than three times the largest of said outside dimensions, whereby said items may tumble down through said channel close to said shoe,
   (b) means to cause air to flow in a flow path through a chamber in said casing on the other side of said partition,
   (c) electrically-powered heat exchange means mounted in said partition with one face thermally coupled to said shoe and an opposite face exposed to said flow path in said chamber;
   (d) means to supply electrical power to said heat exchange means to heat one of said faces and cool the other of said faces to thereby control the temperature of said shoe channel and thereby the temperature within the channel and said receptacle, and
   (e) said casing having discharge opening means providing access to the bottom of said receptacle for removing items stored in said receptacle and a charging opening providing access to the top of said receptacle for introducing items into said receptacle at the top for passage through said channel prior to being removed, said discharge opening means being dimensioned and arranged to prevent the items in said receptacle from falling freely through said discharge opening and to permit accumulation of a plurality of items in said receptacle adjacent the discharge opening, so as to permit manual removal of one or more of said items.

2. A dispenser according to claim 1 wherein said heat exchange means is powered by a direct current power source, the polarity of the power supplied to said heat exchange means determining which of said faces is heated and which of said faces is cooled, said power supply means including means to reverse said polarity.

3. A dispenser according to claim 1 wherein said opposite face has fins projecting into said flow path, said fins comprising a series of spaced parallel flat plates disposed parallel to the direction of air flow in said path, whereby said air flows in the space between said plates.

4. A dispenser according to claim 3 including an air inlet in said chamber below said fins, and an exhaust fan in said casing above said fins to cause the air to flow through said fins.

5. A dispenser according to claim 1 wherein said U-shaped shoe comprises an upwardly sloping base plate substantially coextensive with said transverse partition, a pair of flanges at opposite sides of said base plate and a bottom wall spanning between said side flanges at the bottom of said base plate, said bottom wall forming a bottom in said receptacle and positioned in registry with said discharge opening.

6. A dispenser according to claim 5 wherein said base plate, said flanges and said bottom wall constitute an integral shoe of thermally conductive material providing a uniformly controlled temperature within three sides and the bottom of said receptacle.

7. A dispenser according to claim 5 including a dispensing bin fitted to the bottom of said shoe and projecting out of said casing through said discharge opening whereby items passing down through said channel exit the casing in said bin through said discharge opening.

8. A dispenser according to claim 7 wherein said bin is a stainless steel chute interfitted with said bottom wall and said flanges to provide thermal conductivity between said chute and said shoe.

9. A dispenser according to claim 7 wherein said discharge opening is restricted relative to said bin to permit only a limited number of items to be discharged outwardly from said receptacle into said bin.

10. A dispenser according to claim 7 including a lid hingedly mounted to close the projecting part of said bin.

11. A dispenser according to claim 1 including a lid hinged to said charging opening, said lid being capable of opening to allow said items to be charged into said receptacle.

12. A dispenser according to claim 1 including an insulating liner mounted on said other side of the partition surrounding said heat exchange means.

13. A dispenser according to claim 1 wherein the horizontal width of said upright channel is greater than the longest dimension of a variety of food service items including packets of condiments, sauces, toppings, salads, beverages, creamers and the like.

* * * * *